Sept. 4, 1962     E. ZINN ET AL     3,052,712
PRODUCTION OF DIMETHYL TETRACHLOROTEREPHTHALATE
Filed Sept. 11, 1959
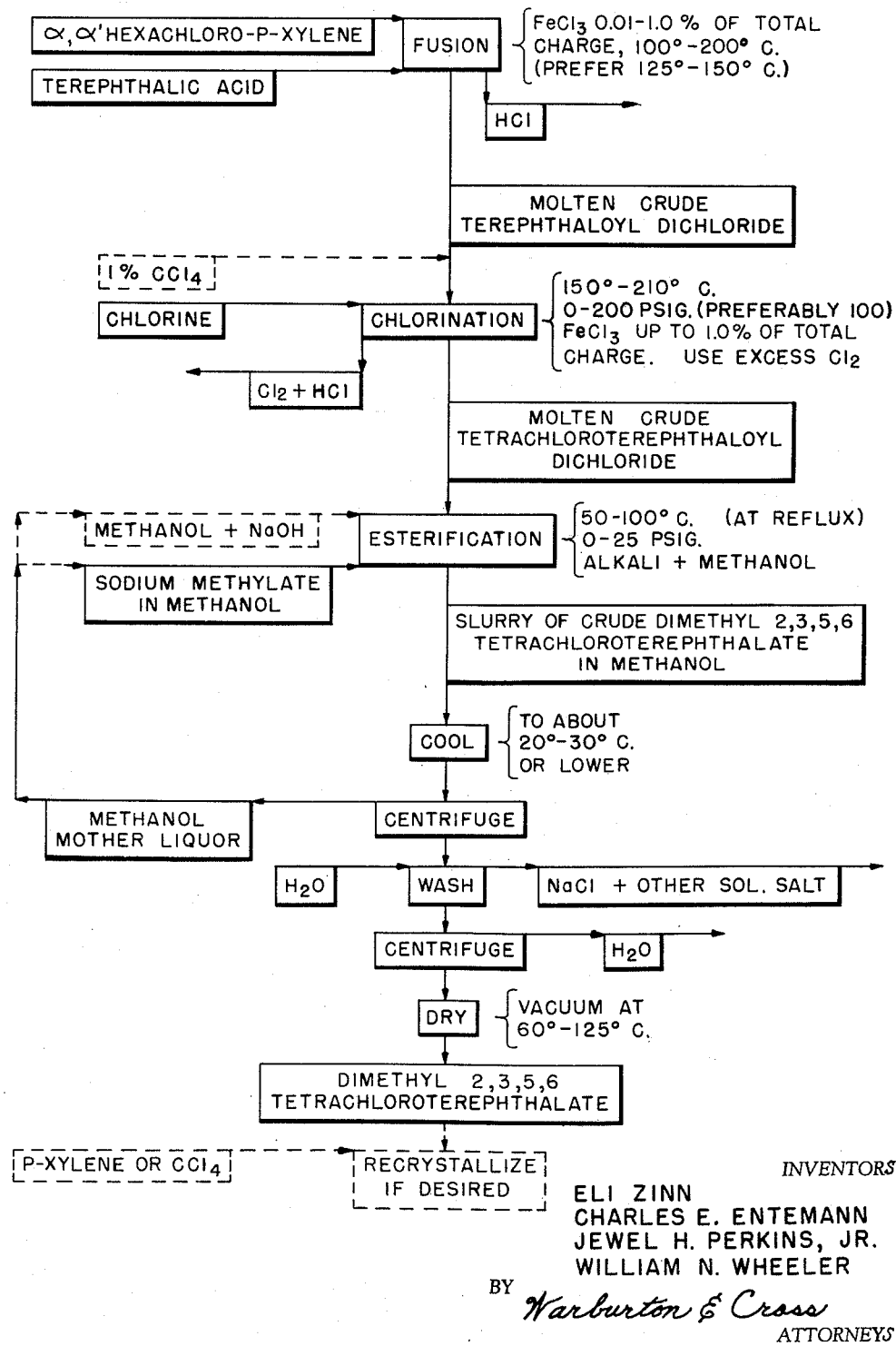
INVENTORS
ELI ZINN
CHARLES E. ENTEMANN
JEWEL H. PERKINS, JR.
WILLIAM N. WHEELER
BY *Warburton & Cross*
ATTORNEYS

United States Patent Office 3,052,712
Patented Sept. 4, 1962

3,052,712
PRODUCTION OF DIMETHYL TETRACHLOROTEREPHTHALATE
Eli Zinn, Charles E. Entemann, and Jewel H. Perkins, Jr., Painesville, and William N. Wheeler, Perry, Ohio, assignors to Diamond Alkali Company, Cleveland, Ohio, a corporation of Delaware
Filed Sept. 11, 1959, Ser. No. 839,519
2 Claims. (Cl. 260—475)

This invention relates to a new and improved method of preparing dimethyl 2,3,5,6-tetrachloroterephthalate.

Dimethyl 2,3,5,6-tetrachloroterephthalate, which has the structure

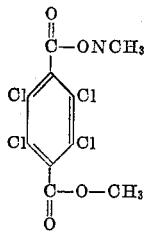

is a known compound disclosed, e.g., by Rabjohn in the Journal of the American Chemical Society, volume 70, page 3518 (1948). The preparation there disclosed comprises reacting 2,3,5,6-tetrachloroterephthalyl chloride with methanol. It has been discovered that dimethyl 2,3,5,6-tetrachloroterephthalate has a singularly effective pre-emergent herbicidal action. With this discovery, interest has turned to the development of a satisfactory method to produce this compound which can meet the requirements of commercial practice in order to obtain a product in good yield and high quality at a minimum cost.

Accordingly, it is the principal object of this invention to provide a new and improved method of producing dimethyl 2,3,5,6-tetrachloroterephthalate.

This and other objects and advantages of the invention will appear more fully from the following description thereof.

Broadly, the present invention comprises the steps of reacting at fusion temperature alpha,alpha'-hexachloro-p-xylene with terephthalic acid, chlorinating the crude reaction product and reacting the crude chlorinated product with a mixture of an alkali and methanol. The term "alkali" as used in the specification and claims is intended to refer to (1) alkali metal hydroxides, i.e., hydroxides of sodium, potassium, cesium, rubidium and/or lithium; (2) alkali metal carbonates, e.g., sodium carbonate or potassium carbonate; (3) alkali metal bicarbonates, e.g., sodium bicarbonate or potassium bicarbonate; and (4) alkali metal methoxides, e.g., sodium methoxide, potassium methoxide, or the like. Of the foregoing materials, alkali metal methoxides (methylates) and alkali metal hydroxides are preferred. Especially advantageous is a methanol solution of sodium methoxide or sodium hydroxide.

More particularly, the method of this invention produces dimethyl 2,3,5,6-tetrachloroterephthalate by successively directly chlorinating a molten crude terephthalyl dichloride at a temperature to obtain a molten tetrachloroterephthalyl dichloride and combining this molten crude product directly with an alkali metal methoxide in methanol. The invention also comprises the sequence of process operations without intermediate purification or product separation steps wherein purified, technical grade or crude alpha,alpha'-hexachloro-p-xylene and terephthalic acid employed in substantially stoichiometric proportions are fused to obtain crude terephthalyl dichloride in molten form which is directly contacted with sufficient chlorine to produce a crude molten tetrachloroterephthalyl dichloride which, in turn, is directly contacted with an alkali metal methoxide and methanol to effect esterification.

An important feature of the present invention comprises the reaction of tetrachloroterephthalyl dichloride, especially when employed in molten form, with an alkali metal methoxide in the presence of a major proportion of methanol.

By the practice of the present invention as described thus far, it will be appreciated that the prior preparation of dimethyl 2,3,5,6-tetrachloroterephthalate which involves tedious purification of the intermediate materials, is avoided entirely. Moreover, prior requirements for recovering and handling of the intermediate products as well as the equipment therefor also are avoided. In addition, the practice of the present invention involves a saving of time and cost as well as completely avoiding the separation and purification of intermediate compounds with the surprising result that despite the use of crude reactants and crude intermediate products directly without purification or other treatment, a high yield of satisfactory quality dimethyl 2,3,5,6-tetrachloroterephthalate is obtained.

Reference is now made to the accompanying drawing for a somewhat more detailed description of the invention. As there shown, alpha,alpha'-hexachloro-p-xylene, which advantageously may be a crude product used as such directly from its situs of preparation, and terephthalic acid are combined, preferably in a glass-lined or steel reactor, in the presence of about 0.01 to 1.0% of ferric chloride by weight of the total charge. The reaction is carried out at a temperature sufficient to fuse the reaction mixture, i.e., generally at a temperature within the range from about 100° to 200° C., preferably 120° to 160° C. Hydrochloric acid is evolved during the fusion reaction and can be absorbed in a conventional MCl absorption system (not shown) or otherwise utilized. From the fusion operation there is obtained a crude molten terephthalyl dichloride to which may be added, if desired, and preferably in most instances, a small amount of a solvent, notably a nonchlorinatable solvent such as carbon tetrachloride, in an amount of about 0.5% to 5% based on the weight of the total reaction mixture treated, desirably about 1% to 2% of carbon tetrachloride, which serves to prevent clogging of the equipment due to sublimation of the reactants during chlorination.

The thus-produced molten crude terephthalyl dichloride is then directly chlorinated in the absence of light by introduction of chlorine. Chlorination is carried out at a temperature within the range from about 150° to 210° C., preferably 170° to 190° C., desirably at a superatmospheric pressure up to about 200 p.s.i.g., preferably 90 to 120 p.s.i.g., in the presence of ferric chloride as a catalyst in an amount up to about 1.0% by weight of the total chlorination reaction charge. In the chlorination, a slight stoichiometric excess of chlorine desirably is employed.

From the chlorination which can be carried out in the same reactor as the fusion, thereby avoiding any handling of the intermediate terephthalyl dichloride, there is obtained a crude molten tetrachloroterephthalyl dichloride which is employed as such without treatment or handling and directly esterified in order to produce the desired dimethyl 2,3,5,6-tetrachloroterephthalate. Esterification in accordance with this invention can be carried out at a temperature within the range from about 50° to 100° C., e.g., at the reflux temperature of methanol at atmospheric pressure or a suitable supatmospheric pressure.

In a preferred esterification of this invention, the molten crude tetrachloroterephthalyl dichloride is introduced as such into methanol and a solution of sodium methoxide, typically a solution of about 15% to 25% by weight sodium methoxide dissolved in methanol added, such a material being commercially available as such or easily prepared by dissolving metallic sodium in methanol. The esterification can be carried out at atmospheric pressure and at the reflux temperature of methanol (65° C.), or, conveniently, at a temperature of about 80° C. which can be obtained by refluxing the mixture at a pressure of about 10 p.s.i.g., desirably the pressure being maintained below about 50 p.s.i.g. When sufficient pressure is employed to maintain the esterification reaction temperature in the range of 90° to 100° C., esterification usually can be carried out in about two hours or less. Generally, it is preferred to regulate the presure and temperature so as to effect esterification over a somewhat longer time of about 5 to 7 hours, although there may well be instances where an extremely short reaction time would be desired, e.g., as in a continuous operation in which case the use of superatmospheric pressure and the resulting higher temperature are recommended.

Alternatively, as shown in the drawing by a broken line, esterification may be carried out by introducing the molten crude tetrachloroterephthalyl dichloride into methanol to which is added a solution of an alkali metal hydroxide, preferably sodium hydroxide, in methanol which, of course, involves generating the desired sodium methoxide in situ. In such event, it generally is desired to use a substantially-saturated solution, i.e., methanol partially or substantially saturated with sodium hydroxide. Satisfactory results are obtained using 25% by weight sodium hydroxide dissolved in methanol.

Whatever alkali is used, the amount of methanol employed constitutes a major proportion of the alkali-methanol mixture. In general, sufficient methanol is used to provide a mixture containing about 0.10 to 0.40 lbs. alkali per gallon of methanol. Thus, a typical mixture consists of 100 gallons of methanol, and/or recycle methanol mother liquor, containing about 300 to 500 lbs. tetrachloroterephthalyl dichloride, to which is added about 75 to 100 gallons of a 25% by weight solution of sodium methoxide or sodium hydroxide. The proportion of alkali-methanol solution to molten crude tetrachloroterephthalyl dichloride employed generally is such that a resultant product slurry containing about 0.5 to 4 lbs. of dimethyl 2,3,5,6-tetrachloroterephthalate per gallon of slurry is obtained.

At present, superior results are obtained when the alkalinity of the esterification medium following esterification is that corresponding to a pH of about 6 to 10, the esterification being carried out at a pH less than 7.0.

Where a choice of equipment for the esterification reaction is available, it generally is preferred to use as a source of the alkali metal methylate, e.g., sodium methylate, a mixture of an alkali metal hydroxide and methanol if glass-lined equipment as available, although, in this instance it will be appreciated that the reaction of the alkali metal hydroxide and methanol does generate a small amount of water which, of course, is not formed with the use of substantially anhydrous sodium methoxide dissolved in methanol. If iron or steel equipment is used, it is desirable to keep the reaction medium alkaline to minimize corrosion.

From the esterification step, there is obtained a slurry of crude dimethyl 2,3,5,6-tetrachloroterephthalate in methanol, typically at a concentration of about 1.5 to 2.5 lbs./gallon, and at an esterification temperature of about 65° C., desirably is cooled to about 20° to 30° C. or lower, depending upon the capacity of the cooling equipment employed and the thus-cooled slurry is centrifuged or filtered to separate methanol which can be recycled, as indicated in the drawing, to the esterification operation.

The solid product is then washed with hot water while retained in the centrifuge, typically at a temperature of about 70° to 80° C., or reslurried in water to dissolve out NaCl and any other sodium salts or water-soluble materials which may be present. The thus-washed material is again centrifuged or filtered to remove water and is dried, typically in a vacuum dryer or other dryer operating at a temperature of about 70° to 125° C. to obtain dimethyl 2,3,5,6-tetrachloroterephthalate, typically about 80% to 92% pure. In those instances where an extremely pure product is desired, the dimethyl 2,3,5,6-tetrachloroterephthalate may be subjected to a conventional recrystallization from a solvent such as p-xylene or carbon tetrachloride as indicated in the drawing.

It will be observed that the practice of the present invention involves the preparation of several products, it being a significant feature of this invention that many of the reaction steps can be carried out in one reactor with the complete elimination of the handling of intermediate products and the purification of such materials which in the past has been difficult, especially when attempted on a large scale. Moreover, it has been found that the practice of the present invention permits the use of relatively impure, i.e., technically pure or crude, initial reactants and intermediates without substantially impairing the purity of the product or reducing its yield to below a commercially acceptable value. Thus, it will be understood that in the preparation of the terephthalyl dichloride, which is accomplished during the fusion, alpha,alpha'-hexachloro-p-xylene of 90% to 100% purity is satisfactory as a reactant to be combined with terephthalic acid of similar purity. As a catalyst, the ferric chloride or other metal chloride, such as zinc chloride, can be combined as such and heated to the indicated temperature of about 100° to 200° C. An alternate, and presently-preferred practice, involves melting the alpha,alpha'-hexachloro-p-xylene at a temperature of about 100° to 110° C., adding the required amount of catalyst, and subsequently gradually introducing the terephthalic acid into the molten alpha,alpha'-hexachloro-p-xylene. The latter procedure affords the advantages of easier and better control and a smoother fusion operation. In any event, it will be observed that there is obtained a crude molten terephthalyl dichloride typically at a temperature of about 150° C. This product can be cooled if desired and is directly chlorinated by the introduction of chloride while retained molten in the same reactor.

It is a feature of this invention that a small amount of a solvent, such as carbon tetrachloride, for sublimed reaction products, may be introduced into the reactor preferably just prior to initiating the chlorination reaction, at which time the temperature of the reactants will be above the boiling point of the solvent, and the introduction of this material serves to prevent plugging of the equipment by sublimed reaction products accumulating on condenser surfaces and the like.

Chlorination is carried out until the desired tetrachloroterephthalyl dichloride is obtained which also is produced in a molten condition. In general, superatmospheric pressure generally is preferred during the chlorination of the terephthalyl dichloride and in some instances, during the esterification, in order to obtain a faster reaction, although the pressure generally should not be allowed to exceed about 50 p.s.i.g. during esterification. Pressures of the order of about 100 p.s.i.g. are preferred during chlorination.

In order that those skilled in the art may more completely understand the present invention and the preferred methods by which the same may be carried into effect, the following specific examples may be offered.

EXAMPLE 1

To illustrate the preparation of tetrachloroterephthalyl dichloride, there are combined in a 10-gallon Pfaudler glass-lined reactor provided with temperature control means and an agitator, 50 lbs. of crude alpha,alpha'-hexachloro-p-xylene (1% molar excess), 26.2 lbs. of terephthalic acid, and 41.5 g. ferric chloride (0.12% of the total reactants). The terephthalic acid and ferric chloride are added to the alpha,alpha'-hexachloro-p-xylene, while the reactor temperature is about 106° C. The reaction is continued with agitation at a temperature gradually increasing to 154° C. for about 3½ hours, at which time an additional 404 g. of ferric chloride and 180 ml. of carbon tetrachloride are introduced just prior to chlorination.

Chlorination of the molten terephthalyl dichloride in the same vessel is then begun, the initial reaction mixture temperature being 137° C. Chlorine is introduced while the presure in the reaction vessel is maintained at 100 p.s.i.g. by controlling the rate of release of the evolved HCl and excess Cl₂ util a total of 154 lbs. of chlorine has been introduced, the reaction temperature being maintained over a period of about 12 hours. The melting point of the resultant crude tetrachloroterephthalyl dichloride product is 140° to 143° C., the final melting point of the dried material being 134° to 137° C. From the reaction, there results 93 lbs. of product, indicating an efficiency of 87.4%.

The tetrachloroterephthalyl dichloride thus obtained is divided into two equal parts, one being mixed with about 9 to 10 gallons of methanol containing 100% sodium hydroxide dissolved therein to provide a 25% solution at the reflux temperature of the methanol at atmospheric pressure to obtain a slurry of crude dimethyl 2,3,5,6-tetrachloroterephthalate which is cooled, centrifuged, washed with water and dried to obtain substantialy pure dimethyl 2,3,5,6-tetrachloroterephthalate, the methanol mother liquor being recycled for use in a subsequent esterification step. The other portion of the tetrachloroterephthalyl dichloride is introduced into 9 to 10 gallons of a solution of 25% sodium methoxide in methanol and the same steps repeated to obtain dimethyl 2,3,5,6-tetrachloroterephthalate.

EXAMPLE 2

Part A

Further to illustrate the practice of the invention, there are combined in a 10-gallon Pfaudler glass-lined reactor 50 lbs. terephthalyl chloride, 0.5 lb. ferric chloride and 0.5 lb. carbon tetrachloride. The conditions of chlorination are set forth in the following table:

Part B

The terachloroterpehthalyl dichloride produced according to Part A in this example is charged in an amount of 50 lbs. into 13 gallons of methanol containing 26.7 liters of 25% sodium methylate solution in methanol using an excess of 2.4 liters of sodium methoxide solution (179 g. per liter of sodium methoxide calculated as NaOH). Esterification is carried out for 8½ hours at a temperature of 65° C. to obtain 41.5 lbs. of crude dimethyl tetrachloroterephthalate comprising 95.2% crude yield based on the tetrachloroterephthalyl dichloride, indicating by infrared analysis a product purity of 87.5%, the crude product melting at 148° to 153° C.

EXAMPLE 3

Part A

Further to illustrate the practice of this invention, there are combined in a 10-gallon Pfaudler, glass-lined reactor 47 lbs. of alpha,alpha'-hexachloro-p-xylene, 24.9 lbs. terephthalic acid, 20 g. ferric chloride with 257 g. ferric chloride and 170 ml. carbon tetrachloride being added upon completion of the fusion, at which time the introduction of chlorine is begun and the following reaction conditions observed:

| Hours from start | Temperatures (° C.) | | Pressures (p.s.i.g.) | | Chlorine | | | | | |
|---|---|---|---|---|---|---|---|---|---|---|
| | Reactor | Jacket | Reactor | Jacket steam | Pounds fed | Percent effic. | Lbs. per hour reacted | Total lbs. reacted | Percent complete | M.P. ° C. |
| 1 | 179 | 0 | 100 | 0 | 16.5 | 78 | 12.9 | 12.9 | 15 | |
| 2 | 180 | 0 | 100 | 0 | 11 | 79 | 8.7 | 21.6 | 25 | |
| 3 | 180 | 0 | 100 | 0 | 10.5 | 84 | 8.8 | 30.4 | 36 | |
| 4 | 178 | 0 | 100 | 0 | 10.5 | 79 | 8.3 | 38.7 | 45 | |
| 5 | 176 | 0 | 100 | 0 | 11 | 62 | 6.8 | 45.5 | 53 | |
| 6 | 174 | 168 | 100 | 90 | 12 | 50 | 6.0 | 51.5 | 61 | |
| 7 | 182 | 168 | 100 | 90 | 10 | 50 | 5.0 | 56.5 | 66 | |
| 8 | 183 | 166 | 100 | 88 | 11 | 65 | 7.1 | 63.6 | 75 | |
| 9 | 178 | 170 | 102 | 100 | 7 | 70 | 4.9 | 68.5 | 81 | |
| 10 | 182 | 171 | 101 | 100 | 7.5 | 61 | 4.6 | 73.1 | 86 | |
| 11 | 185 | 170 | 100 | 95 | 9 | 64 | 5.8 | 78.9 | 93 | |
| 12 | 180 | 170 | 100 | 95 | 9 | 44 | 4.0 | 82.9 | 97 | 128–141 |
| 12.5 | 175 | 173 | 100 | 105 | 5 | 38 | 3.8 | 84.8 | 100 | 137–143 |
| 13 | 171 | 173 | 100 | 104 | 5.5 | 31 | 3.4 | 86.5 | 102 | 141–145 |

Part B

The tetrachloroterephthalyl dichloride of Part A in an amount of 50 lbs. is charged into 13 gallons of methanol containing 26.4 liters of sodium methylate (methoxide) solution in methanol (179 g. per liter sodium methylate in methanol—calculated as NaOH). Esterification is carried out for 7½ hours to obtain 41.5 lbs. of crude dimethyl tetrachloroterephthalate melting at 153° to 156° C., a yield comprising 96.1% based on the tetrachloroterephthalyl dichloride, indicated by infrared analysis to be 88.8% pure.

EXAMPLE 4

In order to illustrate the purification of dimethyl 2,3,5,

| Hours from start | Temperatures (° C.) | | Reactor pressures (p.s.i.g.) | Chlorine | | | | | |
|---|---|---|---|---|---|---|---|---|---|
| | Reactor | Jacket | | Pounds fed | Percent effic. | Lbs./hr. reacted | Total lbs. reacted | Percent complete | M.P. ° C. |
| 0 | 175 | 184 | 55 | 0 | | | 0 | 0 | |
| 1 | 200 | 154 | 100 | 18 | 96 | 17 | 17 | 24 | |
| 2 | 185 | | 100 | 19 | 99 | 19 | 26 | 37 | |
| 3 | 175 | 153 | 100 | 4 | 97 | 4 | 30 | 43 | |
| 4 | 190 | 109 | 100 | 9 | 96 | 8.5 | 38.5 | 55 | |
| 5 | 186 | 100 | 100 | 9 | 92 | 8.3 | 46.8 | 67 | |
| 6 | 178 | 121 | 100 | 8.5 | 84 | 7.1 | 53.9 | 77 | |
| 7 | 180 | 132 | 100 | 8.5 | 78 | 6.6 | 60.5 | 86 | |
| 8 | 180 | 132 | 100 | 11 | 71 | 7.8 | 68.3 | 98 | 92–125 |
| 8.75 | 168 | 139 | 102 | 7 | 50 | 2.6 | 71.8 | 103 | 114–144 |
| 9.25 | 164 | 160 | 102 | 5 | 42 | 4.2 | 73.9 | (¹) | 117–134 |
| 9.75 | 172 | 170 | 102 | 6 | 32 | 3.8 | 75.8 | | 126–137 |
| 10.25 | 173 | 170 | 102 | 5 | 29 | 2.8 | 77.2 | | 123–137 |
| 10.5 | | | | 1.5 | | | | | ² 136–143 |

¹ Possibly some HCl was being formed by chlorinolysis of product.   ² Final.

6-tetrachloroterephthalate, crude dimethyl 2,3,5,6-tetrachloroterephthalate obtained by the practice of the present invention is recrystallized (using 2–3% decolorizing carbon and 5% diatomaceous earth as a filter aid) from carbon tetrachloride and separately from p-xylene under the following conditions yielding the indicated results:

|  | CCl₄ | p-Xylene |
|---|---|---|
| Weight of crude dimethyl 2,3,5,6-tetrachloroterephthalate, g | 300 | 300 |
| Volume of solvent, ml | 500 | 300 |
| Weight solvent/weight crude | 2.7 | 0.9 |
| Color of product | Pure white | Pure white |
| Percent of crude recovered | 80 | 76 |
| Percent recovery of crude dimethyl 2,3,5,6-tetrachloroterephthalate | 89.4 | 84.4 |
| M.P. of purified product, °C | 158.5–160.0 | 159.0–160.0 |

Similar advantageous results are obtained using as a solvent toluene or a crude xylol. If desired, the solvent can be recycled several times, i.e., up to about 4 times.

EXAMPLE 5

Part A

There are charged into a 50 gallon reactor equipped with an agitator and temperature control means 270 lbs. of technical grade alpha,alpha'-hexachloro-p-xylene, 141 lbs. of terephthalic acid and 200 g. anhydrous FeCl₃ as indicated in the following tabularly-indicated procedure:

| Hours | Reactor temp., °C | Remarks |
|---|---|---|
| 0 | | Start to melt 50 lbs. alpha, alpha'-hexachloro-p-xylene in reactor. |
| 3⅓ | | Initial charge is molten; balance of alpha-alpha'-hexachloro-p-xylene added. |
| 4⅝ | | All alpha,alpha'-hexachloro-p-xylene molten; 200 g. FeCl₃ added. |
| 5 | 110 | Terephthalic acid feed started. |
| 6⅜ | | All terephthalic acid introduced. |
| 6⅝ | 135 | |
| 8⅝ | 142 | Reaction considered complete (93.9=terephthalyl dichloride). |

Part B

To the reactor of Part A containing the molten terephthalyl dichloride as prepared is added 1800 g. FeCl₃ as chlorination catalyst and 2500 ml. CCl₄ (to prevent sublimation pluggage). The chlorination procedure is more fully shown in the following table:

| Time (hrs.) | Reactor pressure (p.s.i.g.) | Reactor temp. (°C.) | Chlorine Total lbs. fed | Chlorine Total lbs. reacted | Chlorine Percent eff. | Remarks |
|---|---|---|---|---|---|---|
| ¾ | | | | | | 2,500 ml. CCl₄ added. |
| 1¼ | | | | | | Chlorine feed started. |
| 2¼ | 93 | 173 | 50 | 50 | 100 | |
| 3¼ | 100 | 180 | 100 | 100 | 100 | |
| 4¼ | 100 | 190 | 169 | 167 | 99 | |
| 5¼ | 100 | 180 | 244 | 241 | 99 | |
| 6¼ | 100 | 173 | 319 | 312 | 92 | |
| 7¼ | 100 | 178 | 394 | 375 | 82 | |
| 8¼ | 100 | 173 | 469 | 432 | 70 | |
| 9¼ | 100 | 172 | 544 | 475 | 48 | |
| 10¼ | 100 | 177 | 619 | 511 | 48 | |
| 11¼ | 100 | 165 | 669 | 526 | 13 | |
| 14¼ | 100 | 170 | 819 | 538 | 5 | |
| 15¼ | | | | | | Air stripping started to cool batch to 150° C. |
| 15¾ | | | | | | Transfer to esterifier [1] complete (81.7% tetrachloroterephthaloyl dichloride). |

[1] 300 gallon esterifier containing 110 gallons methanol.

Part C

The crude tetrachloroterephthalyl dichloride of Part B is esterified as follows:

| Time (hrs.) | Esterifier temp. (°C.) | pH | Remarks |
|---|---|---|---|
| 0 [1] | | | Start adding 25% CH₃ONa-methanol solution. |
| ½ | 65.6 | | |
| 1⅓ | 66.7 | | |
| 2⅓ | 66.7 | | |
| 3⅓ | 66.7 | | |
| 4⅓ | 65.6 | 6 | |
| 4⁵⁄₁₂ | 65.6 | 7 | |
| 4¾ | 67.3 | 10 | |
| 4¹¹⁄₁₂ | 66.7 | 10 | Stop adding CH₃ONa; total of 697 lbs. of 25% CH₃ONa-methanol solution added. |
| 6⁷⁄₁₂ | 60.0 | 10 | |
| 7¹⁄₁₂ | 62.2 | 10 | Reaction complete—batch cooled via water jacket. |

[1] 12 minutes elapsed between tetrachloroterephthyalyl dichloride transfer and zero esterification time.

Part D

The crude dimethyl tetrachloroterephthalate of Part C is centrifuged, reslurried (200 gallons water/677 lbs. wet dimethyl tetrachloroterephthalate cake @ 70° C. for 2¾ hours), recentrifuged and washed with methanol (2–3 gallons/centrifuge basket). The product is then dried at 65° C. and 15″ mercury vacuum for 11¼ hours to obtain 472 lbs. of 86.7% pure dimethyl tetrachloroterephthalate thus indicating an overall efficiency from pure terephthalic acid to dimethyl tetrachloroterephthalate of 72.6%.

EXAMPLE 6

Part A

There are charged into a 50-gallon reactor equipped with an agitator and temperature control means 270 lbs. of technical alpha,alpha'-hexachloro-p-xylene, 141 lbs. of terephthalic acid and 200 g. anhydrous FeCl₃ as indicated in the following tabularly-indicated procedure:

| Time (hrs.) | Reactor temp. (°C.) | Remarks |
|---|---|---|
| 0 to 2½ | 120 | 270 lbs. of alpha,alpha'-hexachloro-p-xylene melted. |
| 2½ | 120 | 200 g. FeCl₃ added. |
| 2¾ | | Feed of terephthalic acid started. |
| 4¼ | 125 | Feed of terephthalic acid stopped. |
| 4⁵⁄₁₂ | 140 | Temperature raised to 140° C. |
| 6½ | 148 | Reaction complete (96.4% terephthaloyl dichloride). |

Part B

To the reactor containing the product of Part A is added 1800 g. of anhydrous FeCl₃ and 2500 ml. CCl₄; the progress of the chlorination is as follows:

| Time (hrs.) | Reactor pressure (p.s.ig.) | Reactor temperature (°C.) | Chlorine Total lbs. fed | Chlorine Total lbs. reacted | Chlorine Percent eff. | Remarks |
|---|---|---|---|---|---|---|
| 0 [1] | 0 | 143 | | | | Cl₂ on for pressurizing. |
| ½ | 100 | 145 | 30 | 15 | 50 | |
| 2½ | 100 | 169 | 150 | 125 | 94 | |
| 3½ | 100 | 182 | 225 | 196 | 96 | |
| 8½ | 100 | 175 | 600 | 482 | 61 | |
| 10½ | 100 | 175 | 725 | 516 | 12 | |
| 11½ | 92 | 168 | 755 | 520 | 11 | Bleeding off Cl₂. Transferred to esterifier (89.2% tetrachloroterephthalyl dichloride). |
| 12½ | | | | | | |

[1] 1⅔ hours from end of Part A procedure.

Part C

The crude tetrachloroterephthalyl dichloride of Part B is esterified in a 300-gallon Glascote esterifier as follows using 75 gallons of methanol mother liquor from a prior run and 55 gallons of fresh methanol and an esterifying agent prepared by adding 200 lbs. of flake caustic to 110 gallons of methanol:

| Time (hrs.) | Esterifier Temp. (° C.) | pH | Remarks |
|---|---|---|---|
| 0 [1] | | | Introduction of caustic-methanol begun. |
| 3⅓ | 66 | | |
| 4⅚ | 66 | neutral | |
| 5 9/12 | 60 | 10 | Introduction of caustic-methanol discontinued (80 gal.). |
| 6½ | 62 | 10 | |
| 7⅚ | 64 | | Start cooling. |

[1] 10 minutes between end of tetrachloroterephthalyl dichloride transfer and zero esterification time.

*Part D*

The crude dimethyl tetrachloroterephthalate of Part C is centrifuged, reslurried (200 gallons water/641 lbs. wet dimethyl tetrachloroterephthalate cake @ 75° C. for 4¼ hours) recentrifuged and washed with methanol (2½ gallons/centrifuge basket). The product is then dried at 65° C. (15 in. Hg vacuum) for 8¾ hrs. to obtain 439 lbs. of dried product 88.7% dimethyl tetrachloroterephthalate.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of preparing dimethyl-2,3,5,6-tetrachloroterephthalate which comprises melting α,α'-hexachloro-p-xylene, adding to the molten hexachloro-p-xylene a substantially stoichiometric amount of terephthalic acid and about 0.01% to 1% by weight of the total charge of ferric chloride catalyst, fusing the reaction mixture at a temperature in the range of about 120° to 160° C. to form crude molten terephthalyl dichloride, adding about 1% to 2% by weight of carbon tetrachloride and approximately 1% by weight of ferric chloride chlorination catalyst, introducing a stoichiometric excess of chlorine into the crude molten terephthalyl dichloride at a temperature in the range of about 170° to 190° C. at a superatmospheric pressure of 90 to 120 p.s.i.g. in the absence of light to form crude molten tetrachloroterephthalyl dichloride, introducing the crude molten tetrachloroterephthalyl dichloride into methanol and a solution of about 15% to 25% by weight of sodium methoxide in methanol to esterify the tetrachloroterephthalyl dichloride at a pressure sufficient to maintain the temperature in the range of about 65° to 100° C. and form a slurry of dimethyl tetrachloroterephthalate, the amount of sodium methoxide being sufficient to maintain the esterification medium at a pH less than 7.0 during esterification and between 6 and 10 following esterification and filtering the slurry to separate the dimethyl tetrachloroterephthalate.

2. The method of claim 1 wherein the sodium methoxide is formed in situ by dissolving sodium hydroxide in methanol.

References Cited in the file of this patent
UNITED STATES PATENTS

| | | |
|---|---|---|
| 1,880,169 | Bennett et al. | Sept. 27, 1932 |
| 2,791,608 | Golding | May 7, 1957 |
| 2,890,243 | Brown et al. | June 9, 1959 |

OTHER REFERENCES

Groggins: Unit Processes in Organic Chemistry, third edition (New York, 1947), pages 200 and 640–641.

Rabjohn: J.A.C.S., 70, page 3518 (1948).

Fuson: Advanced Organic Chemistry (New York, 1950), page 194.

Wagner et al.: "Synthetic Organic Chemistry, pages 481, 482, John Wiley, 1953.

Migrdichian: Organic Synthesis I (New York, 1957), pages 319–320.

UNITED STATES PATENT OFFICE
CERTIFICATE OF CORRECTION

Patent No. 3,052,712                               September 4, 1962

Eli Zinn et al.

It is hereby certified that error appears in the above numbered patent requiring correction and that the said Letters Patent should read as corrected below.

Column 1, lines 14 to 23, the formula should appear as shown below instead of as in the patent:

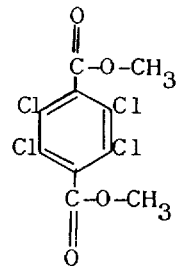

column 2, line 33, for "MCl" read -- HCl --; column 4, line 39, for "chloride" read -- chlorine --; column 5, line 9, for "util" read -- until --; line 23, for "contrifuged" read -- centrifuged --; column 6, line 2, for "terachloroterpehthalyl" read -- tetrachloroterephthalyl --; column 7, line 20, for "i.e." read -- e.g. --; line 50, for "chllorination" read -- chlorination --; column 8, in the table of EXAMPLE 6, Part B, heading to column 2 thereof, for "(p.s.ig.)" read -- (p.s.i.g.) --.

Signed and sealed this 1st day of January 1963.

(SEAL)
Attest:

ERNEST W. SWIDER
Attesting Officer

DAVID L. LADD
Commissioner of Patents